United States Patent [19]

Suzuki et al.

[11] Patent Number: 5,615,038
[45] Date of Patent: Mar. 25, 1997

[54] SCANNING OPTICAL DEVICE WITH ABERRATION COMPENSATION FEATURE

[75] Inventors: Masayuki Suzuki, Zama; Osamu Hoshino, Ebina; Yoshinobu Shiraiwa, Machida; Kazuo Minoura, Yokohama, all of Japan

[73] Assignee: Canon Kabushiki Kaisha, Tokyo, Japan

[21] Appl. No.: 420,706

[22] Filed: Apr. 11, 1995

Related U.S. Application Data

[63] Continuation of Ser. No. 104,947, Aug. 12, 1993, abandoned, which is a continuation of Ser. No. 550,436, Jul. 10, 1990, abandoned.

[30] Foreign Application Priority Data

Jul. 11, 1989 [JP] Japan ................................ 1-178449

[51] Int. Cl.$^6$ ................................................ G02B 26/08
[52] U.S. Cl. .................... 359/210; 250/235; 356/366; 359/196; 359/216
[58] Field of Search ........................ 359/217, 216, 359/212, 196, 483, 213, 210, 218, 219; 250/234, 235, 236, 201.1, 201.2; 346/160; 356/366, 201; 358/481

[56] References Cited

U.S. PATENT DOCUMENTS

| | | | |
|---|---|---|---|
| 3,801,182 | 4/1974 | Jones | 359/202 |
| 4,002,830 | 1/1977 | Brown et al. | 358/481 |
| 4,074,312 | 2/1978 | van Rosmalen | 359/210 |
| 4,123,167 | 10/1978 | Botcherby et al. | 359/210 |
| 4,274,101 | 6/1981 | Kataoka et al. | 359/210 |
| 4,318,582 | 3/1982 | Minoura et al. | 359/202 |
| 4,321,700 | 3/1982 | Russell | 359/216 |
| 4,353,617 | 10/1982 | Tokumitsu et al. | 359/221 |
| 4,639,781 | 1/1987 | Rucci et al. | 358/163 |
| 4,733,064 | 3/1988 | Ishikawa | 358/481 |
| 4,800,546 | 1/1989 | Shikichi et al. | 369/44 |
| 4,841,135 | 6/1989 | Goto et al. | 359/218 |
| 4,903,067 | 2/1990 | Murayama et al. | 346/160 |
| 4,941,719 | 7/1990 | Hisada et al. | 359/217 |
| 4,990,771 | 2/1991 | Minoura et al. | 250/236 |
| 5,033,806 | 7/1991 | Tomita et al. | 359/216 |
| 5,054,866 | 10/1991 | Tomita et al. | 359/201 |

FOREIGN PATENT DOCUMENTS

| | | | |
|---|---|---|---|
| 0054170 | 6/1982 | European Pat. Off. | G02B 27/17 |
| 55-21237 | 2/1980 | Japan | B41J 3/21 |
| 59-116603 | 7/1984 | Japan . | |
| 59-111603 | 7/1984 | Japan | G02B 7/00 |
| 61-25367 | 2/1986 | Japan | H04N 1/23 |
| 61-215367 | 2/1986 | Japan | H04N 1/23 |
| 61-185716 | 8/1986 | Japan | G02B 26/101 |
| 62-112123 | 5/1987 | Japan | G02B 27/00 |

*Primary Examiner*—Scott J. Sugarman
*Attorney, Agent, or Firm*—Fitzpatrick, Cella, Harper & Scinto

[57] ABSTRACT

A scanning optical device for scanning a material to be scanned with a beam emitted from a light source thereof, has a storage device for storing information relating to the quantity of deviation of a scanning optical system. The convergent position of the beams is adjustable in the direction of the optical axis by at least partially controlling the elements of the scanning optical system in accordance with information relating the quantity of deviation supplied by the storage device. The quantity of deviation such as curvature of field of the scanning optical system can be compensated by a simple structure. Therefore, a recording device or reading device employing the scanning optical system exhibiting high resolution, low cost and a capability of preventing deterioration in the gradation expression can be realized.

26 Claims, 4 Drawing Sheets

CURVATURE OF FIELD

SCANNING OPTICAL DEVICE WITH ABERRATION COMPENSATION FEATURE

This application is a continuation, of application Ser. No. 08/104,947 filed Aug. 12, 1993, now abandoned, which in turn is a continuation of application Ser. No. 07/550,436, filed Jul. 10, 1990, now abandoned.

BACKGROUND OF THE INVENTION

1. Field of the Invention

The present invention relates to a scanning optical device suitably used in an image recording apparatus and an image reading apparatus, and, more particularly, to a scanning optical device exhibiting high resolution with a reduced cost.

2. Description of the Prior Art

Hitherto, an apparatus for compensating for the imaging position error of a scanning optical device has been exemplified by devices, such as that disclosed in Japanese Patent Laid-Open No. 59-16603 which comprises a light source moving actuator which moves a piezo electric device to which a light source or a lens is fastened. Another apparatus has been disclosed in Japanese Patent Laid-Open No. 61-25367 in which the quantity of the deviation between a main scanning line and a spot mark is previously stored so that the intensity of a laser which serves as a light source is controlled in accordance with the stored quantity. A still further apparatus has been disclosed in Japanese Patent Laid-Open No. 61-185716 in which an adjustable focusing mechanism operates in such a manner that the laser beam is always linearly imaged on a polygonal mirror surface.

However, the following problems are present in the above-described conventional apparatuses:

According to the first conventional apparatus, the position of the optical element can be controlled by controlling the voltage applied to the piezo electric device so that a good spot imaged state can be realized over the scanning lines on the surface to be scanned.

However, since the voltage level to be applied to the piezo electric device periodically changes, it is very difficult to satisfactorily compensate the scanning lines.

Furthermore, it is difficult to use the first conventional apparatus with the pre-objective scanning optical system which employs an f.θ lens since a description is provided for only the post-objective scanning optical system which does not comprise the f.θ lens.

According to the second conventional apparatus, a compensation method in which the quantity of the deviation between the main scanning line and the spot mark is stored is employed. However, the spot mark is not compensated since the apparatus is arranged in such a manner that the intensity of the laser beam is controlled in accordance with the stored quantity of deviation and the diameter of the recording spot diameter on the surface to be scanned is compensated. Therefore, a high resolution device cannot be easily realized. Furthermore, according to the above-described compensation method, the diameter of the recording spot in the portion in which the quantity of the deviation is large can be made the same as that in the portion in which the quantity of the deviation is small. However, since the exposing energy density is different between the above-described two portions, the recording density becomes non-uniform. As a result, it is very difficult to provide acceptable halftone images.

According to the third conventional apparatus, the curvature of field in the sub-scanning direction (in the sagittal direction) due to the rotation of the polygon mirror can be perfectly compensated. However, the third conventional apparatus cannot compensate the curvature of field in the main scanning direction (in the meridional direction, that is, in a direction perpendicular to the sub-scanning direction perpendicular to the scanning surface which is formed by the scanning beam with time which has been deflected by the rotation of the polygon mirror) and that in the sub-scanning direction (sagittal direction) of the optical system. Therefore, the third conventional apparatus must employ, as the f.θ lens thereof, an optical system the curvature of field of which has been previously and satisfactorily compensated in both the meridional and the sagittal directions. Therefore, the overall cost is raised and the design of the f.θ lens becomes very difficult when high resolution is desired to be achieved.

Therefore, an object of the present invention is to provide a scanning optical device capable of overcoming the above-described problems experienced with the conventional structures and satisfactorily for the quantity of the deviation of the scanning optical system.

SUMMARY OF THE INVENTION

Accordingly, there is provided a scanning optical device for scanning material to be scanned with a beam emitted from a light source thereof, the scanning optical device comprising: storage means for storing information relating to the quantity of deviation of the scanning optical system; and means for adjusting the convergent position of the beam in the direction of the optical axis by at least partially controlling the elements of the scanning optical system in accordance with information relating to the quantity of deviation supplied by the storage device.

The invention in one aspect pertains to a scanning optical device including a light source; a deflecting for deflecting a beams emitted from the light source; a scanning optical system for converging the beam deflected by the deflector onto a predetermined position of a surface to be scanned; storage means for storing information relating to the quantity of deviation of the scanning optical system; and adjustment means for adjusting the convergent position of the beam emitted from the light source in accordance with information supplied from the storage means.

The invention in another aspect pertains to a recording device employing a photosensitive material including a light source; a deflecting for deflecting a beam emitted from the light source; a scanning optical system for converging the beam deflected by the deflector onto the photosensitive material; storage means for storing information relating to the quantity of deviation of the scanning optical system; and adjustment means for adjusting the convergent position of the beam emitted from the light source in accordance with information supplied from the storage means.

The invention in another aspect pertains to a method of adjusting the convergent position of a beam in a scanning optical device having a light source including the steps of storing information relating to the quantity of deviation of the scanning optical system is stored; and adjusting the convergent position of the beam emitted from the light source in accordance with stored information.

The invention in yet another aspect pertains to a scanning optical device, having a light source and a multielement optical system, for scanning a material to be scanned with a beam emitted from the light source, including storage means for storing information relating to the quantity of deviation of the scanning optical system and adjusting means for adjusting the convergent position of the a beam in the direction of the optical axis by controlling at least one of the elements of the scanning optical system in accordance with information relating to the quantity of deviation supplied by the storage means.

Other and further objects, features and advantages of the invention will appear more fully from the following description.

DESCRIPTION OF THE PREFERRED EMBODIMENTS

Figure 1:
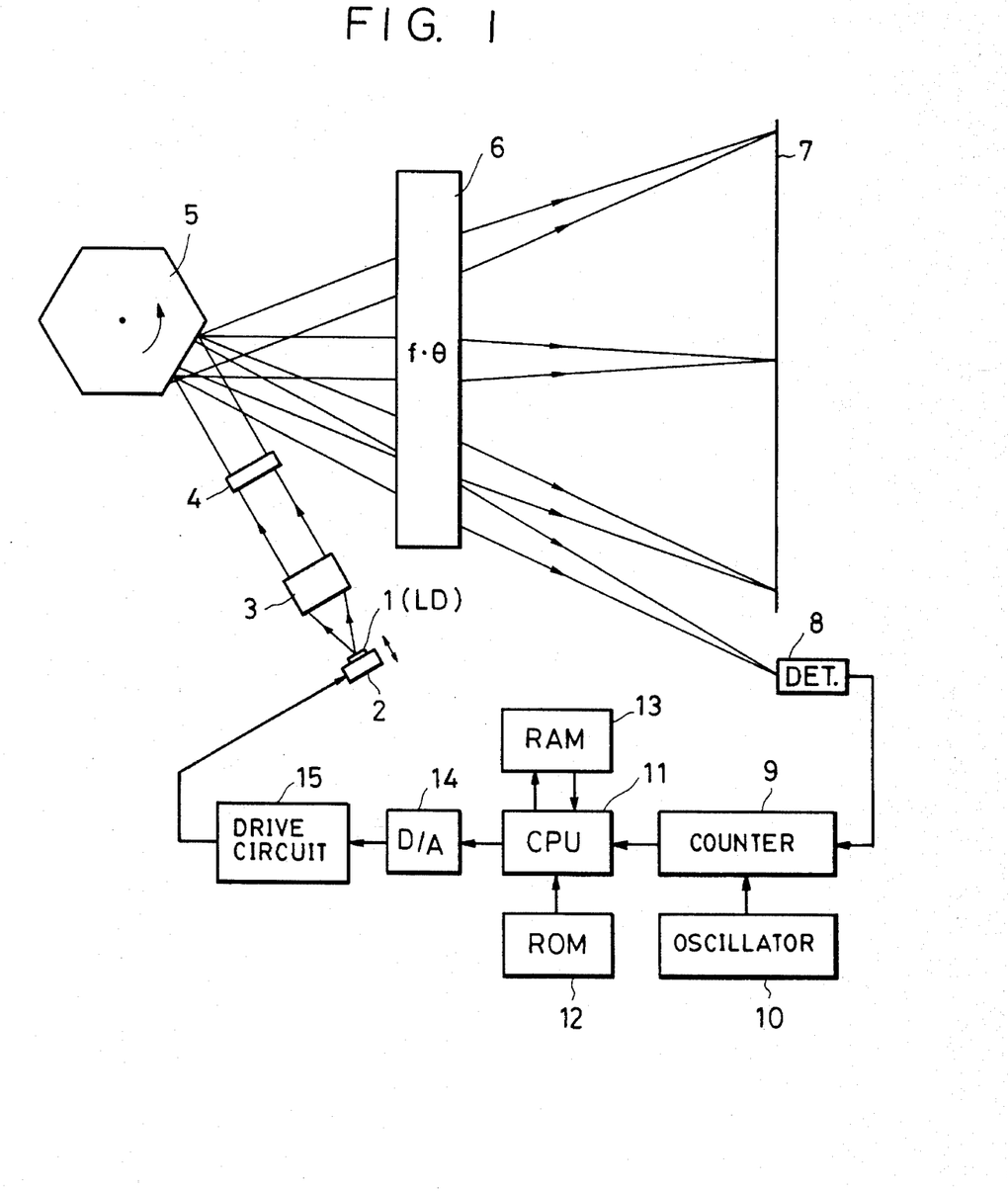
FIG. 1 is a structural view which illustrates a first embodiment of a scanning optical device according to the present invention.

FIG. 1 illustrates a first embodiment of a scanning optical device according to the present invention as used herein, the expression "scanning surface" is defined as a surface formed, with time, by an optical beam deflected by the deflecting reflecting surface of a rotational polygonal mirror serving as a deflector. According to the present invention, the expression "the quantity of deviation of a scanning optical system" is defined as the quantity of an image forming positional error due to the scanning optical system, such as the quantity of aberration involved by the scanning optical system, or such as the natural aberration of the scanning optical system. The aberration is that aberration which is generated due to an eccentricity caused by manufacturing error and which can be previously measured or estimated.

Referring to FIG. 1, reference numeral 1 represents a semiconductor laser (LD), 2 represents a piezo electric device for moving the semiconductor laser 1 in the direction of the optical axis of a collimator lens 3.

Reference numeral 4 represents a cylindrical lens having positive power in the sub-scanning direction perpendicular to the scanning surface. Reference numeral 5 represents a rotational polygonal mirror, 6 represents an f.74 lens and 7 represents a surface to be scanned such as a photosensitive material. A scanning optical system comprises collimator lens 3, cylindrical lens 4, rotational polygonal mirror 5 (deflection) and F.74 lens 6 (converging means). Reference numeral 8 represents a beam detector, 9 represents a counter and 10 represents an oscillator. Reference numeral 11 represents a CPU having a calculation function and 12 represents a memory (ROM) which stores the coefficient values of continuous functions expressing the quantity of the curvature of field which contributes to the deviation of the scanning optical system. Reference numeral 13 represents a memory (RAM) for storing the results of the calculations performed by the CPU 11, 14 represents a D/A converter and 15 represents a drive circuit for operating the piezo electric device 2.

In the above-described apparatus, a laser beam emitted from the semiconductor laser 1 are made to be substantially parallel after passing through the collimator lens 3. The thus formed parallel a beam pass through the cylindrical lens 4 so as to be converged in the sub-scanning direction.

As a result, the converged laser a beam is linearly imaged on the deflecting reflecting surface of the polygonal mirror 5 in the main scanning direction. The a beam deflected and reflected by the polygonal mirror 5 is imaged on the surface 7 to be scanned by the f.θ lens 6.

Then, the imaged a beam scan the surface 7 to be scanned at an equal scanning speed in accordance with the uniform rotation of the polygonal mirror 5.

The scanning spot formed due to the converged laser a beam is arranged to pass through the beam detector 8 disposed on the extension of the surface 7 to be scanned before the scanning spot reaches the effective region to be scanned of the surface 7.

When the laser beam passes through the beam detector 8, the counter 9 starts counting the number of the oscillations of the oscillator 10. The number of the oscillations represents information pertaining to the position of the surface 7 to be scanned which is scanned by the beam spot at a uniform speed.

The CPU 11 calculates the quantity of the curvature of field of the scanning optical system at the scanning position from scanning positional information provided by the counter 9 and data for the coefficient value of the continuous function expressing the quantity of the curvature of field of the scanning optical system is stored in the memory (ROM) 12. Furthermore, the CPU 11 calculates the distance of movement of the semiconductor laser 1 in the direction of the optical axis which corresponds to the quantity of the curvature of field thus calculated. On the basis of the results of the above-described calculations, the CPU 11 causes the D/A converter 14 and the piezo electric device drive circuit 15 to operate the piezo electric device 2 to which the semiconductor laser 1 is fastened.

As a result of the movement of the semiconductor laser 1 in the direction of the optical axis, the curvature of field of the scanning optical system is compensated so that a satisfactorily imaged or converged beam spot (a beam spot in focus) can be obtained over the entire surface to be scanned.

As an alternative to the quantity of the curvature of field, the coefficient obtained in the case where the distance of the movement of the semiconductor laser 1 in the direction of the optical axis which is expressed by a continuous function may be stored in the memory 12. Therefore, the description "the quantity of curvature of field" in the specification for the present invention includes the distance of movement of the optical device or the like which corresponds to the quantity of the curvature of field in the direction of the optical axis and the quantity of phantom curvature of field to be described later.

In the foregoing description, the influence from the time taken for the CPU 11 to complete the calculations or the influence of the response speed of the piezo electric device 2 are not taken into consideration. However, the above-described influences cannot be neglected in designing a practical optical scanning device. Therefore, it is necessary to adopt measures to take into account the above-described influences. The means for eliminating the influences is exemplified by:

(1) In the case where the calculation is performed by the CPU 11 while performing scanning, such as writing or reading, the quantity of the curvature of field which corresponds to the scanning position is calculated. The scanning position is the position at the time after a lapse of the total time to complete the calculation, the time taken for the piezo electric device to move and the delay time due to other factors. As a result, the time delay due to the device such as the CPU 11 or the piezo electric device 2 can be taken into account so that the curvature of field can be compensated with respect to each of the scanning positions.

(2) However, it is not necessary to continue the calculation for obtaining the quantity of the curvature of field by the CPU 11 while performing scanning, such as the writing or the like. The reason for this lies in that, if the quantity of the curvature of field for each of the desired points on the scanning line is calculated before the start of the scanning, such as writing or reading, so as to be stored, it is sufficient to read stored data for the quantity of the curvature of field.

A memory for storing the thus calculated quantity of the curvature of field is arranged to be stored in the RAM 13 shown in FIG. 1. The CPU 11 may read the quantity of the curvature of field, corresponding to the scanning positional information read from the counter 9, from the RAM 13 and may operate the piezo electric device 2 in accordance with the value thus read out. Also in this case, it is necessary to compensate for the time delay due for movement of the device, such as the piezo electric device 2.

According to the first embodiment, the memory (ROM) 12 may, of course, be used to store not only the coefficient for the continuous function which expresses the curvature of field but also to store the other data or a program for operating the CPU 11. Furthermore, the RAM 13 may store the other data in addition to the quantity of the curvature of field.

According to the first embodiment, the output from the oscillator 10 is supplied to only the counter 9 and no description is provided for the clock for the CPU 11. The clock to be supplied to the CPU 11 may be the output from the oscillator or another clock may be employed.

As for the method of compensating the curvature of field, the optical device to be moved in the direction of the optical axis is not limited to the semiconductor laser 1. The collimator lens 3, the cylindrical lens 4 or another optical device to be provided, if necessary, may be moved in the direction of the optical axis. The actuator for moving the optical device is not limited to the piezo electric device 2. It may comprise another device selected from a variety of devices. Furthermore, the convergent position of the laser beam may be adjusted in the direction of the optical axis by changing the refracting power with fixing the position of the optical device. In this case, the optical device may comprise a device the refraction factor of which can be changed by an electric control or a device the plane shape of which can be changed by an electric control.

In the case where a lens is employed as the optical device for compensating for the curvature of field, the lens of this type may be a single lens or a compound lens.

Then, the function for expressing the curvature of field of the scanning optical system will be described.

Figure 2:
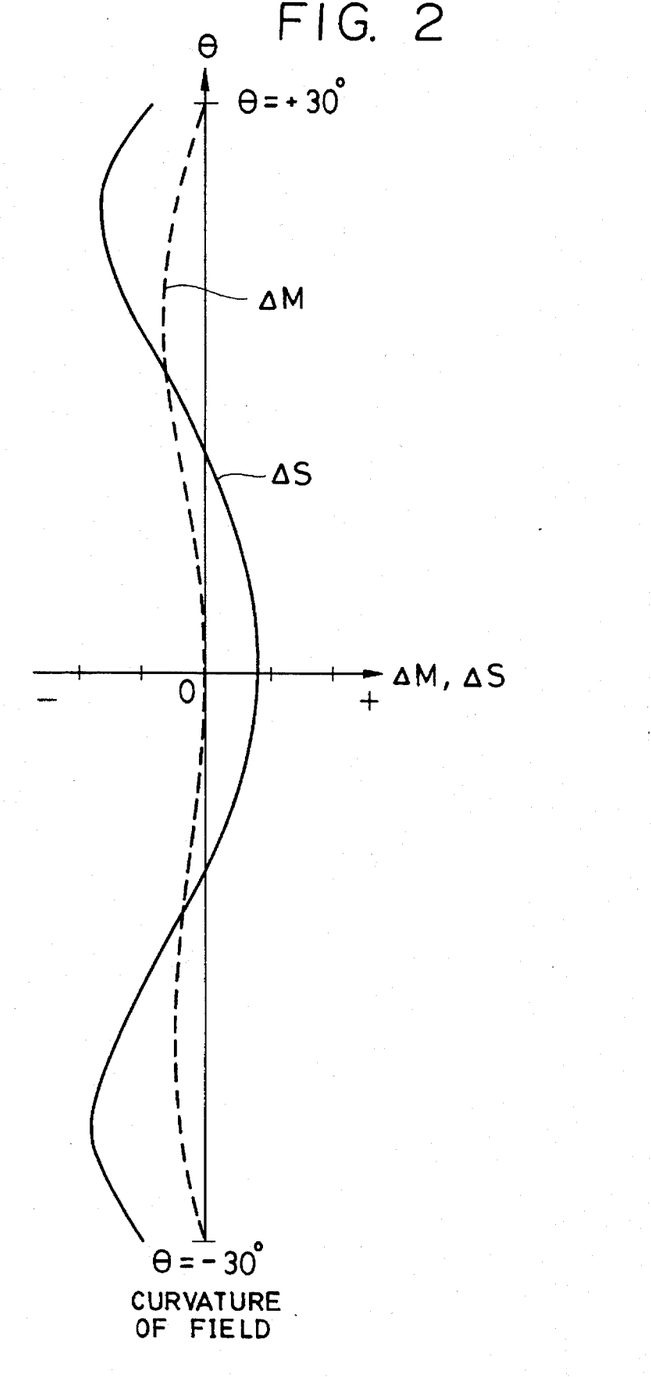
FIG. 2 illustrates an example of the curvature of field of the scanning optical system.

Referring to FIG. 2 which illustrates an example of the curvature of field characteristic of the scanning optical system, symbol $\theta$ represents the scanning angle (an angle made from the reference position of the scanning beam) and $\Delta M$ and $\Delta S$ respectively represent the meridional curvature of field and the sagittal curvature of field. The meridional surface is the main scanning surface which is formed with time by the deflected scanning beam. The meridional direction is the direction in the main scanning direction, while the sagittal direction is the direction perpendicular to the main scanning direction.

The curvature of field $\Delta M(\theta)$ and $\Delta S(\theta)$ shown in Fig. 2 can be expressed by, for example, power series as follows:

$$\Delta M(\theta) = a_0 + a_1\theta + a_2\theta^2 + a_3\theta^3 + a_4\theta^4 + \ldots \quad (1)$$

$$\Delta S(\theta) = a'_0 + a'_1\theta + a'_2\theta^2 + a'_3\theta^3 + a'_4\theta^4 + \ldots \quad (1)'$$

Also, the curvature of field can be expressed by a Fourier series, as follows:

$$\Delta M(\theta) = c0 + c1\cos(\omega\theta) + c2\cos(2\omega\theta) + c3\cos(3\omega\theta) + \ldots + \quad (2)$$
$$d1\sin(\omega\theta) + d2\sin(2\omega\theta) + d3\sin(3\omega\theta) + \ldots$$

$$\Delta S(\theta) = c0 + c1\cos(\omega'\theta) + c2\cos(2\omega'\theta) + c3\cos(3\omega'\theta) + \ldots + \quad (2)'$$
$$d1\sin(\omega'\theta) + d2\sin(2\omega'\theta) + d3\sin(3\omega'\theta) + \ldots$$

Furthermore, the curvature of field may be expressed by another series expansion. It may also be expressed by a spline curve. The memory (ROM) 12 stores the following coefficients:

In the case of Equation (1): $a_0, a_1, a_2, a_3, a_4 \ldots$

In the case of Equation (1)': $a'_0, a'_1, a'_2, a'_3, a'_4 \ldots$

In the case of Equation (2): $\omega, c_0, c_1, c_2, \ldots, d_1, d_2, \ldots$

In the case of Equation (2)': $\omega', c_0, c_1, c_2, \ldots, d_1, d_2, \ldots$ Since the above-described coefficients are stored, the quantity of curvature of field can be immediately obtained by calculations performed by the CPU 11 if the scanning angle $\theta$ (the scanning position) is given.

Although the curvature of field is expressed as the function of the scanning angle $\theta$ in the above-made description, it may be expressed by the function of the scanning position "y" away from the spot reference position on the surface 7 to be scanned or the function of time "t" measured from the time at which the beam has passed through the beam detector 8 described in accordance with the first embodiment as an alternative to the scanning angle $\theta$.

As a method for obtaining the coefficient of the above-described series function to be supplied to the ROM 2, a variety of curve fitting methods, such as the least square method, each of which depends upon data for the curvature of field of the scanning optical system. The above-described series function may be subjected to an origin shift or a normalization.

As for the series data to be stored in the ROM 12, only data for the meridional curvature of field $\Delta M$ may be stored, or only data for the sagittal curvature of field $\Delta S$ may be stored. Furthermore, data for the two curvature of field or the deviation from the proper structural value for the other scanning optical system may be stored.

That is, the deviation or the curvature of field to be compensated must not be the curvature of field of the scanning optical system ($\Delta M, \Delta S$). A phantom image surface may be created which is different from $\Delta M$ and $\Delta S$ by adding other information to information $\Delta M$ and $\Delta S$. For example, the average of $\Delta M$ and $\Delta S$ may be arranged to be the curvature of field to be compensated. Furthermore, the value expressed by $(w_M \cdot \Delta M + w_S \cdot \Delta S) / (w_M + w_S)$ may be the curvature of field to be compensated, the value being obtained by employing weights "wM" and "ws" which takes each numerical aperture (N.A.) in the meridional and sagittal directions, that is, the number of apertures (or F-number) into consideration.

According to the first embodiment of the present invention shown in FIG. 1, a pre-objective scanning optical system and as well an anamorphic optical system are employed. However, the thesis of the present invention may be employed as it is in a post-objective scanning optical system or a scanning optical system constituted by a spherical lens.

Next, a second embodiment of the present invention will be described in which a digital control signal, in which timing can be easily arranged at the time of recording an image, is employed.

Figure 3:
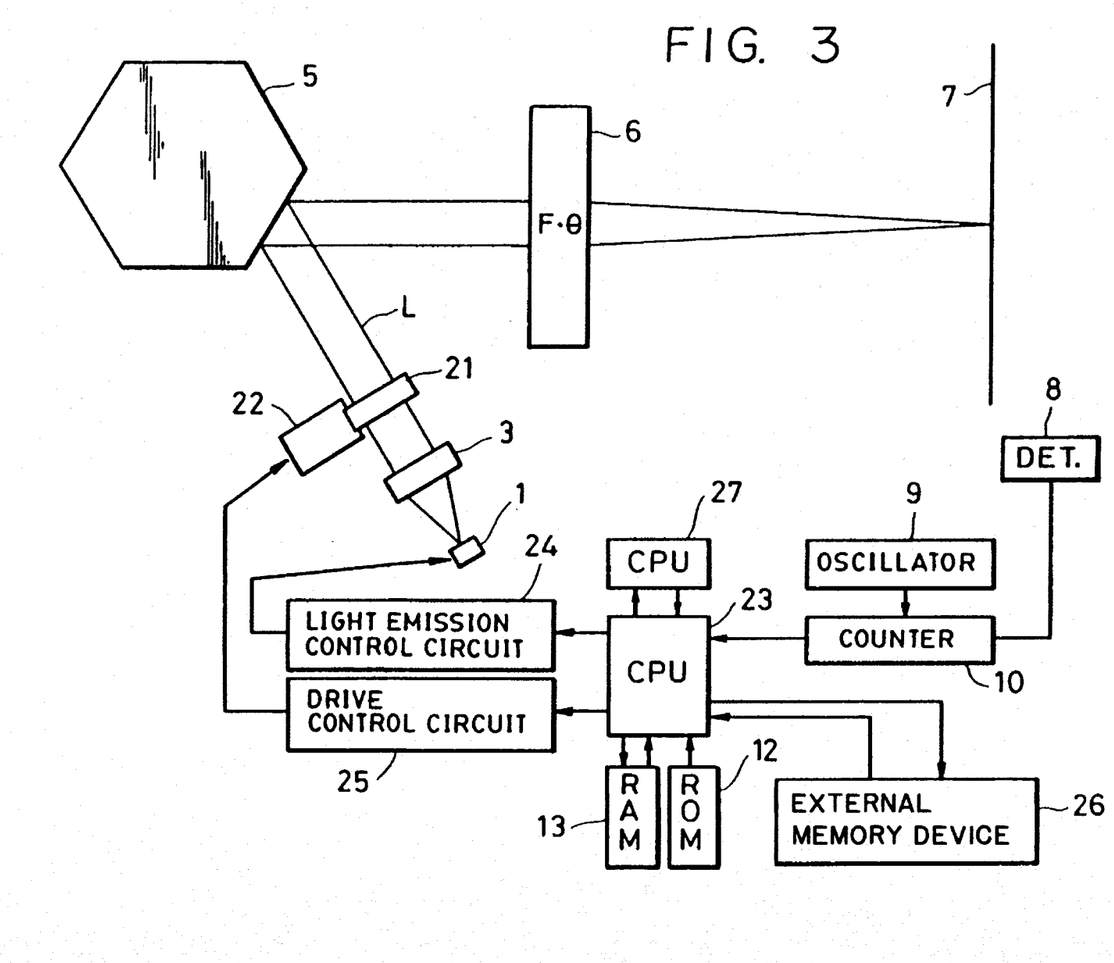
FIG. 3 is a structural view which illustrates a second embodiment of the scanning optical device according to the present invention.

According to the second embodiment of the scanning optical device as shown in FIG. 3, reference numeral 21 represents a convergent optical system having an optical system for changing the position of the beam waist of laser beam L (the converged position of laser beam) on the surface 7 to be scanned. Reference numeral 22 represents a control system for controlling the convergent optical system 21. Reference numeral 23 represents a central processing unit (CPU) for controlling the transmission, receipt, reading and writing of data to and from a semiconductor laser emission control circuit 24, a laser beam drive control circuit 25, the memory (ROM) 12, the RAM 13, an external memory device 26 and an operation device (CPU) 27. The external memory device 26 stores specific information such as image information or the like, while the operation device 27 calculates the beam waist position from stored data. The ROM 12 stores the deviation of the scanning optical system such as the quantity of the curvature of field, while the RAM 13 temporarily stores environment information of the device (temperature, humidity and the like). The control circuit 24 controls the intensity of the laser beam emitted from the semiconductor laser 1. The control circuit 25 controls the control system 22 for controlling the beam waist position of the laser beam L. The same elements as those shown in FIG. 1 are given the same reference numerals.

Although the operation of the second embodiment is basically the same as that of the first embodiment, it will be described.

The laser beam L deflected by the polygonal mirror 5 is converged, by the convergent optical system 6 comprising the f.θ lens, into a spot having a certain size Gaussian distribution in both the main scanning and sub-scanning directions. It is preferable that the spot, formed on the surface 7 to be scanned, always have a uniform shape. The surface 7 is the surface of a photosensitive recording material. However, as described above, the spot cannot become uniform at all scanning positions due to an aberration, such as the curvature of field of the scanning optical system, or the like.

Therefore, the aberration of the type described above is previously stored in the ROM 12 and the other information is stored in the RAM 13, the external memory device 26 and the like. The thus stored information is used to operate the drive control circuit 25 via the CPU 23 in synchronization with the light emission control circuit 24. As a result, the beam waist position control system included in the convergent optical system 21 is operated by the control system 22 so that the convergent position of the beam is adjusted so as to always make uniform the diameter of the spot on the surface 7 to be scanned.

Figure 4:
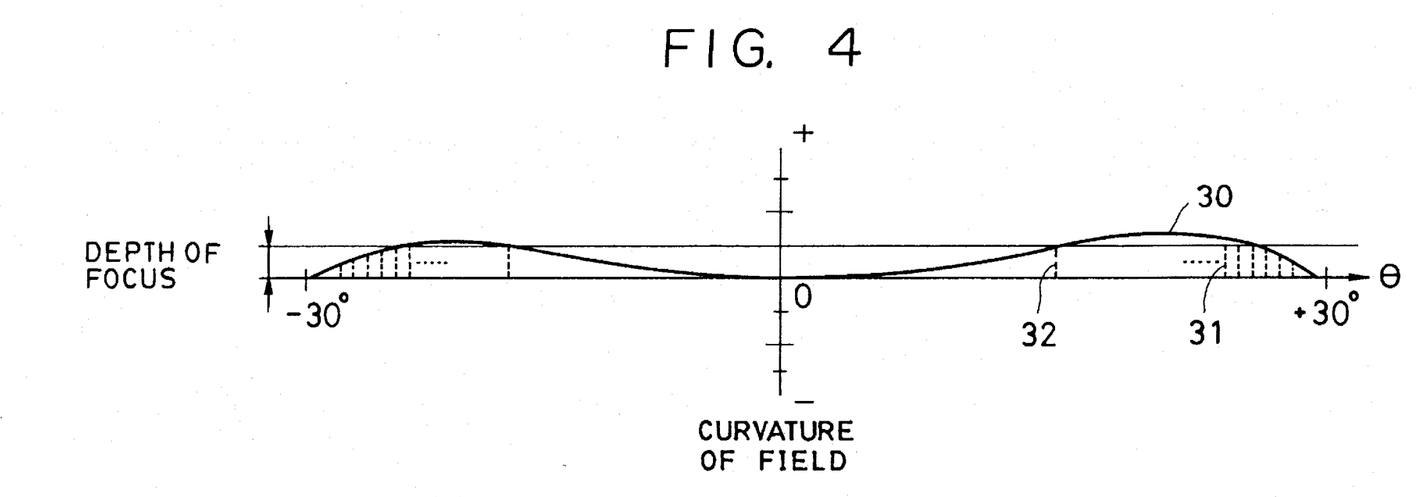
FIG. 4 illustrates the curvature of field of the scanning optical system according to the second embodiment of the present invention.
Figure 5:
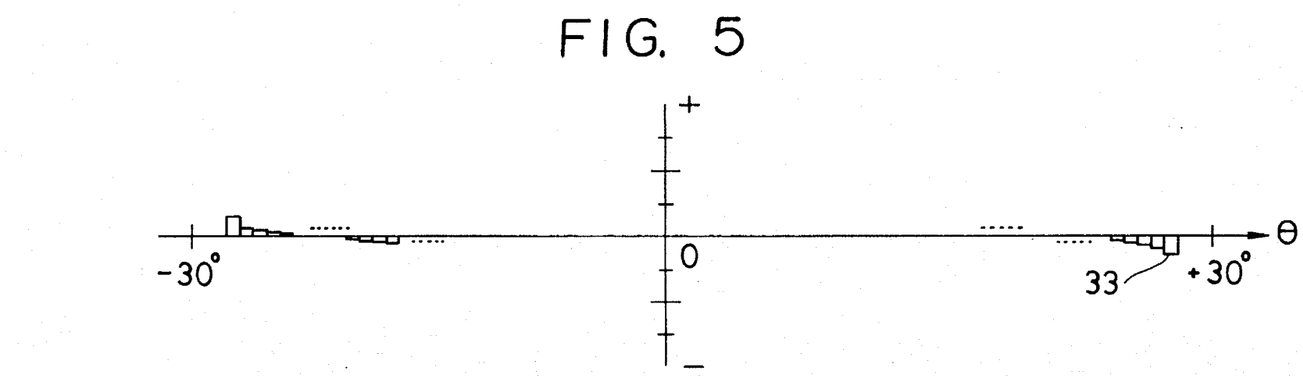
FIG. 5 illustrates another example of the digital signal to be stored and obtained in FIG. 4.

For example, in a case where the scanning optical system has a curvature of field 30 as shown in FIG. 4, the curvature of field is stored in the ROM 12 or the external memory device 26 as a digital signal in a pixel unit as designated by a broken line 31 shown in FIG. 4 or at a sampling interval which does not exceed the focal depth of the scanning optical system from the surface to be scanned as designated by an alternate long and short dash line 32. As an alternative with reference to FIG. 5, a calculation for obtaining a difference signal 33 from the previous signal of the digital signal for a pixel unit is performed by the operation device 27. Then, the most suitable beam waist position is calculated by the operation device 27 from the above-described digital signal or the difference signal 33 in consideration of the signal taken out by the beam detector 8 so as to convert the thus calculated signal into a digital signal. Then, the position of the beam waist is controlled by operating the operation control circuit 25 by the central processing unit 23 from the beam scanning position information measured by the oscillator 9 and the counter 10 on the basis of the signal supplied from the beam detector 8 in synchronization with the light emission control circuit 24 so as to make the diameter of the spots on the surface 7 to be scanned the same.

Another apparatus may be employed in which information relating to the aberration of the scanning optical system is stored in the external memory device 26 together with image information so that a control can be performed in which the beam waist positional information is taken out together with image information.

According to the second embodiment, information relating to the aberration of the scanning optical system is stored as digital information. The thus stored information is used to accurately control the beam waist position in synchronization with the deflecting scanning optical system such as the polygonal mirror 5 so that the effective spot diameter of the laser beam or the exposure intensity on the surface 7 to be scanned is controlled. As a result, a desired value can be obtained. Therefore, since the digital control signal is used, the above-described synchronization operation can be easily performed.

As described above, according to the present invention, the quantity of deviation such as a curvature of field of a scanning optical system can be compensated by a simple structure. Therefore, a recording device or reading device employing the scanning optical system exhibiting high resolution, low cost and a capability of preventing deterioration in the gradation expression can be realized.

While the present invention has been described with respect to what is presently considered to be the preferred embodiments, it is to be understood that the invention is not limited to the disclosed embodiments. To the contrary, the present invention covers all modifications and equivalents included within the spirit and scope of the appended claims. The scope of the following claims is to be accorded the broadest interpretation so as to encompass all such modifications, and equivalent structures and functions.

What is claimed Is:

1. A scanning optical device comprising:

a light source;

a scanning optical system comprising:
   a deflector for deflecting a beam emitted from said light source, and
   converging means for converging the beam deflected by said deflector onto a predetermined position of a surface to be scanned;

storage means for storing a quantity of a curvature of field of said scanning optical system, the quantity of the curvature of field being sampled at intervals which do not exceed a depth of focus of said scanning optical system relative to the surface to be scanned; and adjustment means for adjusting the convergent position of the beam in the direction of an optical axis of the beam emitted from said light source in accordance with the quantity of the curvature of field supplied from said storage means.

2. A scanning optical device according to claim 1, wherein said adjustment means moves said light source in the direction of said optical axis.

3. A scanning optical device according to claim 1, wherein the quantity of the curvature of field of said scanning optical system comprises information relating to the quantity of aberration of said scanning optical system.

4. A recording device employing a photosensitive material comprising:

a light source;

a photosensitive material;

a scanning optical system comprising:
 a deflector for deflecting a beam from said light source, and
 converging means for converging the beam deflected by said deflector onto the photosensitive material;

storage means for storing a quantity of a curvature of field of said scanning optical system, the quantity of the curvature of field being sampled at intervals which do not exceed a depth of focus of said scanning optical system relative to a surface of the material to be scanned; and adjustment means for adjusting the convergent position of the beam in the direction of an optical axis of the beam emitted from said light source in accordance with the quantity of the curvature of field supplied from said storage means.

5. A recording device according to claim 4, wherein said adjustment means moves said light source in the direction of an optical axis.

6. A recording device according to claim 4, wherein the quantity of the curvature of field of said scanning optical system comprises information relating to the quantity of aberration of said scanning optical system.

7. A method of adjusting a convergent position of a beam in a scanning optical device having a light source comprising the steps of:

storing a quantity of a curvature of field of said scanning optical device, the quantity of the curvature of field being sampled at intervals a which do not exceed a depth of focus of said scanning optical device relative to a surface of a material to be scanned; and adjusting the convergent position of the beam in the direction of an optical axis emitted from said light source in accordance with the stored quantity of the curvature of field.

8. A method of adjusting according to claim 7, wherein said step of adjusting is performed by the movement of said light source in the direction of the optical axis.

9. A method of adjusting according to claim 7, wherein the quantity of the curvature of field of said scanning optical device comprises information relating to the quantity of aberration of said optical system.

10. A scanning optical device including a light source and a multi-element optical system, for scanning a material to be scanned with a beam emitted from the light source, comprising:

storage means for storing a quantity of a curvature of field of the multi-element optical system; and adjustment means for adjusting a convergent position of the beam in the direction of an optical axis by controlling at least one of the elements of the multi-element optical system in accordance with the quantity of the curvature of field supplied by the storage means, wherein the storage means stores the quantity of the curvature of field of said scanning optical device, the quantity of the curvature of field being sampled at intervals which do not exceed a depth of focus of the multi-element optical system relative to the surface of the material to be scanned.

11. The scanning optical device according to claim 10, wherein the storage means stores a coefficient value of a continuous function which expresses the quantity of the curvature of field for a desired degree of accuracy.

12. The scanning optical device according to claim 11, further comprising calculating means for calculating the quantity of the curvature of field of the multi-element optical system at every scanning position by using the coefficient value,
 wherein the adjustment means is operated accordance with the quantity of the curvature of field supplied from said calculating means.

13. The scanning optical device according to claim 10, wherein the quantity of the curvature of field is the quantity of the curvature of filed of an element in the multi-element optical system.

14. A scanning optical device including a light source and a multi-element optical system, for scanning a material to be scanned with a beam emitted from a light source, comprising:

storage means for storing a quantity of a curvature of field of the multi-element optical system, the quantity of the curvature of field being sampled at intervals which do not exceed a depth of focus of the multi-element optical system relative to the surface of the material to be scanned; and adjustment means for adjusting a convergent position of the beam in the direction of an optical axis by controlling at least one of the elements of the multi-element optical system in accordance with the quantity of the curvature of field of said scanning optical device supplied by said storage means, wherein said storage means stores the quantity of the curvature of field of said scanning optical device for each pixel on a surface of the material to be scanned.

15. A method of adjusting a convergent position of a beam in a scanning optical device having a light source, comprising the steps of:

storing a quantity of a curvature of field of the scanning optical device, the quantity of the curvature of field being sampled at intervals which do not exceed a depth of focus of the multi-element optical system relative to the surface of the material to be scanned; and adjusting the convergent position of a beam emitted from the light source in accordance with the stored quantity of the curvature of field by moving the light source.

16. A method of adjusting a convergent position of beams in a scanning optical device having a light source according to claim 15, wherein said adjusting step moves the light source in the direction of the optical axis.

17. A scanning optical device, including a light source and a multi-element optical system for scanning a surface of a material to be scanned with a beam emitted from the light source, comprising:

storage means for storing a quantity of a curvature of field of the multi-element scanning optical system, the quantity of the curvature of field being sampled at intervals which do not exceed a depth of focus of the multi-element optical system relative to the surface of the material to be scanned; and adjustment means for adjusting a convergent position of the a beam in a direction of an optical axis by controlling an actuator for moving the light source in accordance with the quantity of the curvature of field supplied by said storage means.

18. The scanning optical device according to claim 17, wherein said storage means stores a coefficient value of a continuous function which expresses the quantity of the curvature of field supplied by said storage means.

19. The scanning optical device according to claim 18, further comprising calculating means for calculating the quantity of the curvature of field of the multi-element optical system at an optical scanning position or a quantity corresponding to it by using the coefficient value, wherein said adjustment means is operated in accordance with the quantity of the curvature of field or the quantity corresponding to it supplied from said calculating means.

20. The scanning optical device according to claim 17, wherein the quantity of the curvature of field is a quantity of the curvature of field of an element in the multi-element optical system.

21. The scanning optical device according to claim 17, wherein said storage means stores information relating to the quantity of the curvature of field for each pixel on the surface of the material to be scanned.

22. The scanning optical device according to claim 17, wherein said storage means stores the quantity of the curvature of field at a sampling interval which does not exceed a focal length of the multi-element optical system relative to the surface of the material to be scanned.

23. A scanning optical device according to claim 17, further comprising a polariscope for polarizing beam emitted from the light source.

24. A scanning optical device according to claim 17, wherein said adjustment means moves the light source in the direction of the optical axis.

25. A scanning optical device according to claim 17, wherein the quantity of the curvature of field of the multi-element optical system is information relating to the quantity of aberration of the multi-element optical system.

26. A recording/reading device comprising:

reading/recording means; and a scanning optical device including (i) a light source and (ii) a multi-element optical system for scanning a surface of a material to be scanned with a beam emitted from the light source, said scanning optical device comprising:

storage means for storing a quantity of a curvature of field of the multi-element optical system, the quantity of the curvature of field being sampled at intervals which do not exceed a depth of focus of the multi-element optical system relative to the surface of the material to be scanned; and adjustment means for adjusting a convergent position of the a beam in a direction of an optical axis by controlling an actuator for moving the light source in accordance with the quantity of the curvature of field supplied by said storage means.

* * * * *

UNITED STATES PATENT AND TRADEMARK OFFICE
CERTIFICATE OF CORRECTION

PATENT NO. : 5,615,038　　　　Page 1 of 4
DATED : March 25, 1997
INVENTOR(S) : MASAYUKI SUZUKI, ET AL.

It is certified that error appears in the above-indentified patent and that said Letters Patent is hereby corrected as shown below:

COLUMN 1:

Line 40, close up right margin.
　　Line 41, close up left margin.
　　Line 43, close up right margin.
　　Line 44, Close up left margin.

COLUMN 2:

Line 38, "deflecting" should read --deflector--.(1st occurr)
　　Line 39, "beams" should read --beam--.
　　Line 50, "deflecting" should read --deflector--.(1st occurr)
　　Line 66, "multielement" should read --multi-element--.

UNITED STATES PATENT AND TRADEMARK OFFICE
CERTIFICATE OF CORRECTION

PATENT NO. : 5,615,038      Page 2 of 4
DATED : March 25, 1997
INVENTOR(S) : MASAYUKI SUZUKI, ET AL.

It is certified that error appears in the above-indentified patent and that said Letters Patent is hereby corrected as shown below:

COLUMN 3:

Line 4, "a" should be deleted.
    Line 49, "piezo electric" should read --piezoelectric--.
    Line 51, close up right margin.
    Line 52, close up left margin.
    Line 55, "f.74 lens" should read --f·θ lens--.
    Line 59, "F.74 lens" should read --f·θ lens--.

COLUMN 4:

Line 2, "piezo electric" should read --piezoelectric--.
    Line 4, "in" should read --In--.

UNITED STATES PATENT AND TRADEMARK OFFICE
CERTIFICATE OF CORRECTION

PATENT NO. : 5,615,038

DATED : March 25, 1997

INVENTOR(S) : MASAYUKI SUZUKI, ET AL.

It is certified that error appears in the above-indentified patent and that said Letters Patent is hereby corrected as shown below:

COLUMN 4:

Line 5, "are" should read --is--.
Line 11, "a" should be deleted.
Line 13, close up right margin.
Line 14, close up left margin.
Line 14, "a beam scan" should red --beam scans--.
Line 61, "piezo electric" should read --piezoelectric--.

COLUMN 5:

Line 25, "piezo electric" should read --piezoelectric--.
Line 28, "piezo electric" should read --piezoelectric--.
Line 64, "symbolθ" should read --symbol θ--.

UNITED STATES PATENT AND TRADEMARK OFFICE
CERTIFICATE OF CORRECTION

PATENT NO. : 5,615,038
DATED : March 25, 1997
INVENTOR(S) : MASAYUKI SUZUKI, ET AL.

It is certified that error appears in the above-indentified patent and that said Letters Patent is hereby corrected as shown below:

COLUMN 6:

Line 10, "(1)" should read --(1)'--.
Line 57, "is, the" should read --is, it is not always necessary that the--.
Line 58, "not" should be deleted.
Line 64, "(wM+ws)" should read --(wm+ws)--.

Signed and Sealed this

Twenty-fifth Day of November, 1997

Attest:

BRUCE LEHMAN

Attesting Officer

Commissioner of Patents and Trademarks